United States Patent [19]

Stausebach

[11] Patent Number: 4,582,094
[45] Date of Patent: Apr. 15, 1986

[54] INSULATION FOR HOT GAS PIPING

[75] Inventor: Dieter Stausebach, Bonn, Fed. Rep. of Germany

[73] Assignee: Interatom Internationale Atomreaktorbau GmbH, Bergisch-Gladbach, Fed. Rep. of Germany

[21] Appl. No.: 502,970

[22] Filed: Jun. 10, 1983

[30] Foreign Application Priority Data

Jun. 11, 1982 [DE] Fed. Rep. of Germany ....... 3222121

[51] Int. Cl.⁴ ............................................. D03D 49/26
[52] U.S. Cl. .................................... 138/147; 138/149; 285/47
[58] Field of Search ........................ 285/47, 48, 49, 50, 285/51, 52, 53, 54, 55; 138/149, 147

[56] References Cited

U.S. PATENT DOCUMENTS 2,599,210 6/1952 Thompson ........................... 138/149
2,650,180 8/1953 Walker ............................... 285/47 X
3,213,889 10/1965 Cotman ............................. 285/47 X
4,237,668 12/1980 Mathusima ....................... 138/149 X
4,363,504 12/1982 De Feo et al. ......................... 285/47

FOREIGN PATENT DOCUMENTS 2532895 2/1977 Fed. Rep. of Germany.

Primary Examiner—Dave W. Arola
Attorney, Agent, or Firm—Herbert L. Lerner; Laurence A. Greenberg

[57] ABSTRACT

A pipeline carrying high-temperature fluids and having an inner conduction pipe, an outer pressure pipe and ceramic insulation disposed between the inner and outer pipes and formed of individual sections being spaced apart defining gaps therebetween, includes ceramic insulating rings formed of woven insulating fiber filling the gaps between the sections of the ceramic insulation, the rings being concentrically disposed one against the other on the inner pipe and having doubled-over edges.

3 Claims, 3 Drawing Figures

INSULATION FOR HOT GAS PIPING

The invention relates to insulation for hot gas piping, and more particularly to ceramic insulation formed of individual sections, for pipelines carrying fluids of high temperature, equipped with an inner conduction pipe and an outer pressure pipe, with gaps between the section being filled with ceramic insulating material in fiber form. The use of such pipelines is planned, for instance, for nuclear power plants which are operated with a gas-cooled high-temperature reactor. Operating temperatures of up to 950° C. are assumed. For controlling these high temperatures, the pipeline is to be constructed of an inner tube of heat-resistant ceramic which conducts the flow but is not pressure-tight, and an outer metallic tube meant to take over the pressure enclosure function. Insulating material is placed between the inner and the outer tube to ensure that the operating temperature prevailing in the inner pipe will be reduced to a stage which is still permissable for the metallic material of the outer pipe, such as 300° C. Mineral fibers have preferably been proposed as the insulating material.

Like other pipelines, the hereinafore-described pipeline is also assembled from individual sections which are welded together during assembly in a pressure-tight manner, in the case of the outer pipe. This is not possible with the ceramic material of the inner pipe so that the individual sections can only be pushed together. The joints of the inner pipe are constructed with a mutual overlap, so that the individual sections remain centered with each other even in the event of length changes due to temperature changes, and the gap occuring between them is largely sealed. The same is true for the insulating materials which come in bale or mat form; in this case as well, the gas occuring between the sections must be sealed to prevent the hot gas strands which escape from the inner pipe from making contact with the outer pipe. For sealing gaps between ceramic bodies assembled in the manner which is used for masonry, the use of insulating fiber mats has been proposed in German Published, Prosecuted Application DE-A 25 32 895.

It is accordingly an object of the invention to provide an insulation for hot gas piping, which overcomes the hereinafore-mentioned disadvantages of the heretofore-known devices of this general type, and to improve the just described seal between the individual insulating bodies through the use of structured but flexible sealing elements.

With the foregoing and other objects in view there is provided, in accordance with the invention, a pipeline carrying high-temperature fluids and having an inner conduction pipe, an outer pressure pipe and ceramic insulation disposed between the inner and outer pipes and formed of individual sections being spaced apart defining gaps therebetween, comprising a plurality of ceramic insulating rings formed of woven insulating material in fiber form filling the gaps between the sections of the ceramic insulation, the rings being concentrically pushed one against the other on the inner pipe and having doubled-over edges.

Rings woven from insulating fibers combine the desired flexibility with an unambiguously defined thickness and density. By assembling rings with edges that are doubled-over in the form of a hem, zones with high contact pressure are created, thus achieving a special degree of tightness.

In accordance with a concomitant feature of the invention, the rings each have a woven structure being angularly offset relative to each other.

The offset assembly of the woven fabric provides an additional labyrinth effect impeding leakage flow.

Other features which are considered as characteristic for the invention are set forth in the appended claims.

Although the invention is illustrated and described herein as embodied in an insulation for hot gas piping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
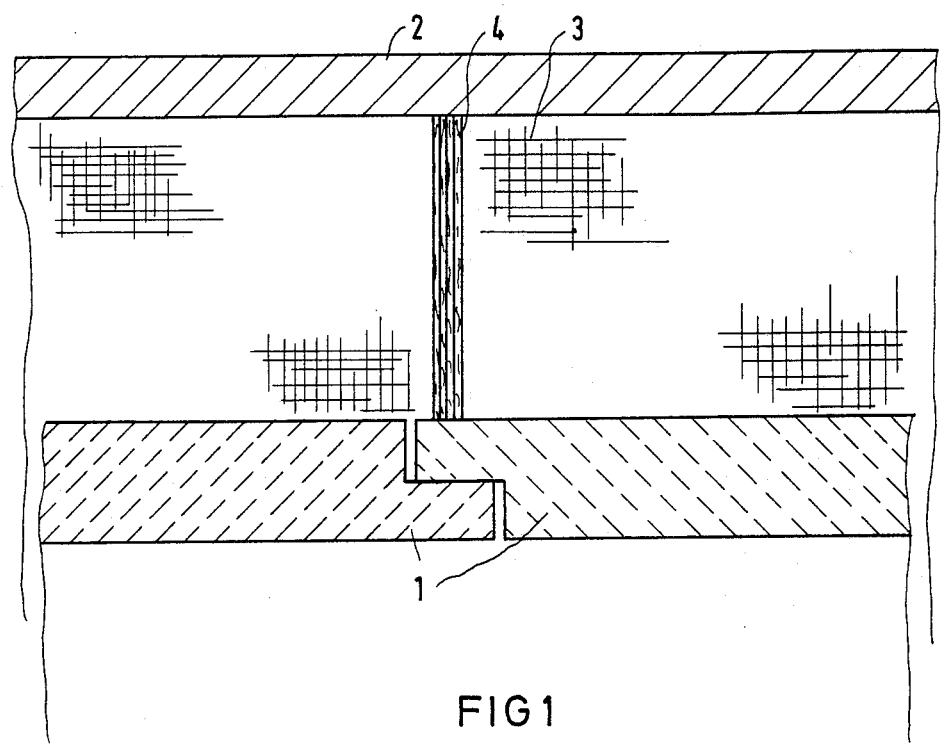
FIG. 1 is a fragmentary, diagrammatic, axial longitudinal-sectional view through half of a hot gas pipeline.
Figure 2:
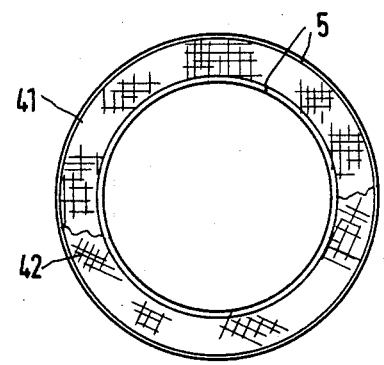
FIG. 2 is a front elevational view, partially broken away, of a stack of sealing rings which are used.
Figure 3:
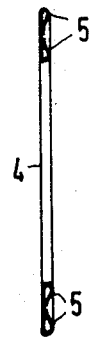
FIG. 3 is a side elevational view of an individual one of these rings.

Referring now to figures of the drawing in detail, there is seen a pipeline intended for transporting hot fluids, such as helium used for cooling a high-temperature nuclear reactor. The pipeline is formed of an inner gas-conducting pipe 1 which is constructed from individual sections that are plugged or inserted into each other, two of which being shown in the drawing. The pipe is made of heat-resistant ceramic, but is not pressure-proof. The pressure enclosure function is rather taken over by an outer pipe 2 which is made of metallic material and has individual sections which are welded together in a conventional pressure-tight manner. However, the metallic materials used therefor are not capable of withstanding the high temperature prevailing in the inner pipe. The space between the two pipes is therefore filled with insulation 3, such as mats which are wrapped on top of each other and are formed of a mineral insulating material. Between the mats as well as between the individual sections of the inner pipe 1, gaps can form due to temperature changes, whereby a leakage flow of the hot fluid can travel into the vicinity of the outer pipe and can endanger the strength of the outer pipe. Therefore, several rings 4 (four in the example shown) are disposed between individual sections of the insulation 3 and are pushed over the inner pipe 1. The rings 4 are woven of a mineral fiber. The rings 4 are doubled-over at the inner as well as the outer edge 5 as seen in FIG. 3 and are preferably sewed in the form of a hem. The thus doubled thickness of the rings permits increased pressure in this area and accordingly improved sealing action. A further improvement is obtained from the fact that the different stacked-up rings 41, 42 . . . seen in FIG. 2 are disposed with their woven structure at an angle to each other, such as 25°, from one ring 41 to another ring 42.

The foregoing is a description corresponding in substance to German Application No. P 32 22 121.5, dated June 11, 1982, the International priority of which is being claimed for the instant application, and which is hereby made part of this application. Any material discrepancies between the foregoing specification and the aforementioned corresponding German application are to be resolved in favor of the latter.

I claim:

1. In a pipeline carrying high-temperature fluids and having an inner conduction pipe, an outer pressure pipe and ceramic insulation disposed between the inner and outer pipes and formed of individual sections being spaced apart defining gaps therebetween, the improvement comprising ceramic insulating rings formed of woven insulating fiber filling the gaps between the sections of the ceramic insulation, said rings being concentrically disposed one against the other on the inner pipe and having doubled-over peripheral edges.

2. Pipeline according to claim 1, wherein said rings each have a moven structure with a grain, said grain in each of said rings being angularly offset relative to each other.

3. Pipeline according to claim 1, wherein said rings are oriented perpendicular to the axial direction of the pipes.

* * * * *